United States Patent Office 2,986,129
Patented May 30, 1961

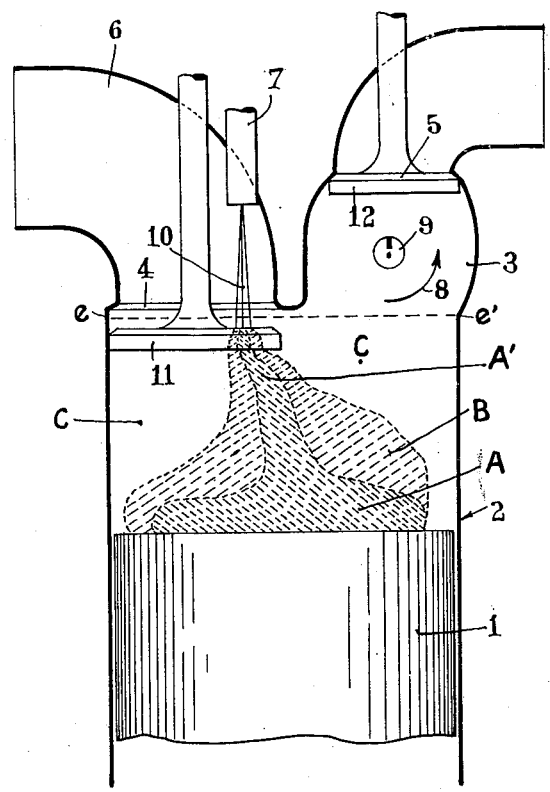

2,986,129

METHOD OF INJECTING FUEL CONTINUOUSLY IN INTERNAL COMBUSTION ENGINES

Edmond Henry-Biabaud, Paris, France, assignor to Societe Anonyme Andre Citroen, Paris, France Filed May 29, 1958, Ser. No. 738,829

Claims priority, application France Oct. 10, 1957

3 Claims. (Cl. 123—28)

In a prior patent, Patent No. 2,587,339, there is described a method of injecting fuel into a spark-ignition engine, wherein a non-homogeneous or stratified mixture of air and fuel is prepared, the stratification and a high turbulence of the complete mixture being combined at the end of the compressing stroke to permit the combustion of either rich mixtures yielding a high power output or lean mixtures—leaner than those permitted by conventional carburetion methods—and to give a higher engine efficiency.

However, in this prior patent only the direct injection into the combustion chamber or the engine cylinder is contemplated; now the direct-injection equipment is costly and complicated.

Now this invention is concerned with a form of embodiment of this general method which affords the same advantages as direct injection and is characterized in that the fuel injection is effected within the induction pipe in a continuous manner.

The basic idea of this invention is that it is possible to produce a heterogeneous mixture by injecting the fuel near the intake valve in a continuous manner. In fact, with this procedure about the three-fourths of the fuel is deposited on the intake valve during the closing movement thereof; consequently, the initial part of the induction stroke takes place with a mixture having a high fuel content, as the three-fourths of the fuel penetrate into the cylinder during a very short time period (corresponding approximately to 30° of the engine rotation), the remaining part of the induction stroke consisting in introducing a very lean mixture into the cylinder.

Different tests carried out on these lines with engines identical to those operating satisfactorily with the direct-injection system proved to be a complete failure; the engines ran satisfactorily with ordinary mixtures but were unable to properly burn the lean mixtures. Further tests indicated that if the engine was so designed that the intake turbulence were less pronounced than in the case of direct injection, the proper and correct results could be obtained with very lean mixtures, exactly as in the case of direct injection.

Consequently, it is necessary for carrying out this type of combustion to advantage that the turbulence be reduced to a minimum during the induction stroke; this implies a very accurate design to the induction pipe; on the other hand, for a given cubic capacity of the engine, the lower the velocity of the induction air, and therefore the greater the diameter of the intake valve, the better the results. More particularly, the best results are obtained with short piston strokes and relatively large cylinder bores.

Thus, the engine suitable for carrying out the method broadly set forth hereinabove is characterized by specific dispositions affording:

(1) An air intake having the minimum possible turbulence and, to this end, by a very regular and simplified shape of the induction pipe, in combination with the largest possible intake valve;

(2) The injection of fuel in close proximity of the intake valve, said injection being effected continuously to give a fuel-rich mixture during the initial part of the induction, the end of the induction stroke being attended by the formation of a very lean mixture;

(3) The production, at the end of the compression stroke, of a high turbulence throughout the mixture, and the ignition of the heterogeneous mixture produced beforehand in the turbulence zone;

(4) An improvement in the disposition set forth in (2) hereinabove, which consists in directing the fuel into a specific zone of the intake valve in order to produce at a predetermined moment a heterogeneous flow around this valve, thus further increasing the heterogeneity of the mixture.

To facilitate the understanding of this invention and of the manner in which the same may be carried out in the practice, reference will now be made to the single figure of the accompanying drawing forming part of this specification and illustrating diagrammatically by way of example an engine wherein the piston is in its bottom dead centre.

The piston 1 moves within the cylinder 2, and the cylinder-head consists of a turbulence chamber 3, of the intake valve seat 4 engaged by the inlet valve 11 in its closed position and of the exhaust valve seat 5 engaged by the exhaust valve 12 in its closed position. The induction pipe 6 has a very regular shape and an injector 7 extends through its wall. The injection takes place continuously during the operation of the engine. The fuel accumulating on the intake valve during the closing period thereof penetrates into the cylinder during the initial part of the induction stroke, thus creating a very rich zone A near the piston. As the injection is effected in the form of a jet 10 at one point of the intake valve seat contour, the fuel, after the intake valve opening, passes through the intake port but mainly at one point of the valve periphery, thereby creating another very rich zone A' co-extensive with zone A. Surrounding these zones A and A' is another zone B having a lean fuel content, whereas at other points such as C only pure air may be present. This is but a diagrammatic and very approximate illustration of the phenomena taking place during the injection.

As the piston rises in the cylinder it drives the mixture, in the vicinity of the top dead centre e—e' into the turbulence chamber as indicated by the arrow 8 so as to impart a high turbulence to the complete mixture. Then this mixture is ignited by the spark plug 9 placed in the turbulence chamber.

Of course, it will be readily understood by anybody conversant with the art that various modifications may be brought to the form of embodiment of the invention which is given herein by way of example, without departing from the spirit and scope of the invention as set forth in the appended claims.

What I claim is:

1. A liquid-fuel internal combustion engine comprising a cylinder having a side wall and a head and having a relatively great diameter with respect to its height, a tubular induction manifold of very regular shape and uniform diameter communicating with said cylinder through a circular inlet port of same diameter in the cylinder head, said circular port extending from one side of said cylinder substantially to the axis of said cylinder in a plane at right angles to said axis, an inlet valve reciprocated in a direction parallel to the axis of said cylinder for opening and closing said inlet port, a spray nozzle mounted in said induction manifold and having its axis substantially parallel to the cylinder axis, said spray nozzle being adapted to deliver a continuous jet of fuel forward the outer face of said inlet valve, a piston reciprocated in said cylinder and having a flat face located relatively close to said inlet valve in the top dead center position of said piston and in the close position of said valve, a turbulent chamber in said cylinder head extending axially away from said piston and radially approximately from the axis of the cylinder to the side of the cylinder opposite said inlet port, a tubular exhaust manifold communicating with said turbulence chamber through a circular exhaust port extending in a plane at right angles to the cylinder axis, an exhaust valve reciprocated in a direction parallel to the cylinder axis for opening and closing said exhaust port, and an ignition spark plug mounted substantially centrally of said turbulence chamber.

2. In a liquid-fuel internal combustion engine, a cylinder having a side wall and a head, a piston reciprocable in said cylinder, means defining a circular inlet port in said head extending substantially from a side to the axis of said cylinder, a tubular induction manifold of regular shape and uniform diameter substantially equal to the diameter of said inlet port leading to said inlet port, a reciprocable inlet valve for opening and closing said inlet port, a nozzle mounted in said induction manifold in proximity to said inlet valve and adapted to deliver a continuous jet of fuel onto the outer face of said valve, a turbulence chamber in said cylinder head extending axially away from said piston and radially approximately from the axis of the cylinder to the side of the cylinder opposite said inlet port, means defining an exhaust port opening out of said turbulence chamber, a reciprocable exhaust valve for opening and closing said exhaust port and a spark plug having an inner end approximately in the center of said turbulence chamber, liquid fuel being discharged by said nozzle onto the outer face of the inlet valve when said inlet valve is closed and being drawn into the cylinder with air from said induction manifold with low turbulence when said inlet valve is open during an initial portion of an intake stroke of said piston to provide in said cylinder a zone of rich-fuel-air mixture, additional air being thereafter drawn into the cylinder during a continuance of said intake stroke to provide a zone of lean fuel-air mixture and the resulting non-homogeneous mixture being compressed with relatively high turbulence in said turbulence chamber by the compression stroke of the piston and being fired by said spark plug.

3. In a liquid-fuel internal combustion engine, a cylinder having a side wall and a head, a piston reciprocable in said cylinder, means defining a circular inlet port in said head extending substantially from a side to the axis of said cylinder and lying substantially in a plane perpendicular to said axis, a tubular induction manifold leading to said inlet port and shaped to provide low turbulence flow into said cylinder, a reciprocable inlet valve for opening and closing said inlet port, a nozzle mounted in said induction manifold and adapted to deliver a continuous jet of fuel onto the outer face of said inlet valve, a turbulence chamber in said cylinder head extending axially away from said piston and radially substantially from the axis of the cylinder to the side of the cylinder opposite said inlet port, means defining an exhaust port opening out of said turbulence chamber and lying substantially in a plane perpendicular to the cylinder axis and a spark plug having an inner end disposed approximately centrally of said turbulence chamber, liquid fuel being discharged by said nozzle onto the outer face of the inlet valve when said inlet valve is closed and being drawn into the cylinder with air from said induction manifold with low turbulence when said inlet valve is open during an initial portion of an intake stroke of said piston to provide in said cylinder a zone of rich fuel-air mixture, additional air being thereafter drawn into the cylinder during a continuance of said intake stroke to provide a zone of lean fuel-air mixture and the resulting non-homogeneous mixture being compressed with relatively high turbulence in said turbulence chamber by the compression stroke of the piston and being fired by said spark plug.

References Cited in the file of this patent

UNITED STATES PATENTS

| | | |
|---|---|---|
| 2,522,456 | Mallory | Sept. 12, 1950 |
| 2,888,912 | Brueder | June 2, 1959 |

OTHER REFERENCES

SAE Journal, April 1957, pages 20 to 25 inclusive.